United States Patent
Han et al.

(10) Patent No.: US 11,748,117 B2
(45) Date of Patent: Sep. 5, 2023

(54) OPERATING SYSTEM PARTITIONING OF DIFFERENT USERS FOR SINGLE-USER APPLICATIONS

(71) Applicant: Microsoft Technology Licensing, LLC, Redmond, WA (US)

(72) Inventors: Xiaoxi Han, Vancouver (CA); Jason Scott Holmes, Kirkland, WA (US); Shaheed Gulamabbas Chagani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/185,500

(22) Filed: Feb. 25, 2021

(65) Prior Publication Data
US 2022/0269511 A1 Aug. 25, 2022

(51) Int. Cl.
G06F 1/24 (2006.01)
G06F 9/00 (2006.01)
G06F 9/445 (2018.01)
G06F 8/61 (2018.01)
G06F 9/4401 (2018.01)

(52) U.S. Cl.
CPC ............ *G06F 9/4451* (2013.01); *G06F 8/61* (2013.01); *G06F 9/4406* (2013.01); *G06F 9/4411* (2013.01)

(58) Field of Classification Search
CPC ............................ G06F 9/4451; G06F 9/4406
See application file for complete search history.

(56) References Cited

U.S. PATENT DOCUMENTS

| 9,003,432 B1* | 4/2015 | Pellowski ........... G06F 11/3419 719/321 |
| 9,069,607 B1* | 6/2015 | Gopalakrishna Alevoor .............. G06F 9/4856 |
| 10,122,752 B1* | 11/2018 | Soman ................. H04L 63/0227 |
| 2005/0278458 A1* | 12/2005 | Berger .................... G06F 16/27 709/248 |

(Continued)

OTHER PUBLICATIONS

Melber, Derek, "Protecting System Files with UAC Virtualization", Retrieved From: https://techgenix.com/protecting-system-files-uac-virtualization-part1/, Nov. 26, 2008, 11 Pages.

(Continued)

*Primary Examiner* — Mohammed H Rehman

(57) ABSTRACT

Examples described herein generally relate to a computer device including a memory, and at least one processor configured to partition application files for multiple users of the computer device. The computer device creates a per-user location for a first user when installing an application package to an installation location. The application package includes a plurality of files for an application that are read-only for the first user. The computer device projects, via one or more filter drivers, installed package files from the installation location into the per-user location. The computer device receives a modification to the plurality of files for the application projected into the per-user location. The computer device writes at least one modified file into the per-user location. The computer device loads, during execution of the application by the first user, the at least one modified file from the per-user location for the first user.

20 Claims, 5 Drawing Sheets

(56) References Cited

U.S. PATENT DOCUMENTS

| | | | |
|---|---|---|---|
| 2006/0206881 A1* | 9/2006 | Dodge | G06F 9/4881 |
| | | | 717/140 |
| 2007/0022425 A1* | 1/2007 | Jackson | G06F 9/5061 |
| | | | 718/104 |
| 2014/0114957 A1 | 4/2014 | Hackborn et al. | |
| 2015/0127661 A1* | 5/2015 | Zamir | G06F 16/178 |
| | | | 707/748 |
| 2017/0076075 A1* | 3/2017 | Smith | G06F 9/44 |
| 2018/0129666 A1 | 5/2018 | Havewala et al. | |
| 2018/0288173 A1* | 10/2018 | Schacht | H04L 69/329 |

OTHER PUBLICATIONS

"International Search Report & Written Opinion issued in PCT Application No. PCT/US22/013588", dated May 10, 2022, 14 Pages.

* cited by examiner

OPERATING SYSTEM PARTITIONING OF DIFFERENT USERS FOR SINGLE-USER APPLICATIONS

BACKGROUND

The present disclosure relates to computer file system management, and more particularly to partitioning of different users for single-user applications.

Computer devices may be shared among multiple users. Each user may have a user account. An operating system may provide partitioning among the multiple users. For example, an operating system may utilize an access control list (ACL) to determine which users are allowed to read, write, or execute a file. In some cases, an executable file (e.g., an application) may be executed by multiple users. This may allow a single copy of an application to be used by the multiple users without increasing the space of the application on a hard disk of the computer device.

One issue with multiple users accessing a single application is that each user may want to modify the application in a different way. For example, users of a video game application may want to have separate progress files (e.g., saved games) that are inaccessible to the other users. As another example, a user may want to modify the video game application by changing resource files (e.g., character skins, background images, languages). In another example, a user may want to modify the video game by installing a plug-in that changes the code executed by the application. In each of these examples, the user would like to make changes to the files associated with an application without the changes affecting the other users of the computer device.

Current operating systems and execution environments may not provide sufficient partitioning of users that share access to an application. For example, an operating system may allow one or more users to modify shared files. The changes by the one or more users may affect all users. For security, the allowed users may be restricted to administrators or other privileged users, but this restriction reduces the experience of the other users. An alternative approach is to completely separate each user by installing a separate copy of the application for each user. While providing separation between users, this approach may also increase the size of the application files on disk. This is particularly problematic for large video game files.

Thus, there is a need in the art for improvements in partitioning of users for applications executed by computer devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a computer device for partitioning application files for users to allow multiple users to modify an application. The computer device may include a memory and at least one processor communicatively coupled to the memory. The at least one processor may create a per-user location for a first user when installing an application package to an installation location, the application package including a plurality of files for an application that are read-only for the first user. The at least one processor may project, via one or more filter drivers, installed package files from the installation location into the per-user location that is mutable for the first user. The at least one processor may receive a modification to the plurality of files for the application projected into the per-user location. The at least one processor may write at least one modified file into the per-user location. The at least one processor may load, during execution of the application by the first user from a central location for all users, the at least one modified file from the per-user location for the first user.

In another example, the disclosure provides a method for partitioning application files for users to allow multiple users to modify an application. The method may include creating a per-user location for a first user when installing an application package to an installation location, the application package including a plurality of files for an application that are read-only for the first user. The method may include projecting, via one or more filter drivers, installed package files from the installation location into the per-user location that is mutable for the first user. The method may include receiving a modification to the plurality of files for the application projected into the per-user location. The method may include writing at least one modified file into the per-user location. The method may include loading, during execution of the application by the first user from a central location for all users, the at least one modified file from the per-user location for the first user.

In another example, the disclosure provides a computer-readable medium, storing code executable by one or more processors for partitioning application files for users to allow multiple users to modify an application. The computer-readable medium may include code for creating a per-user location for a first user when installing an application package to an installation location, the application package including a plurality of files for an application that are read-only for the first user. The computer-readable medium may include code for projecting, via one or more filter drivers, installed package files from the installation location into the per-user location that is mutable for the first user. The computer-readable medium may include code for receiving a modification to the plurality of files for the application projected into the per-user location. The computer-readable medium may include code for writing at least one modified file into the per-user location. The computer-readable medium may include code for loading, during execution of the application by the first user from a central location for all users, the at least one modified file from the per-user location for the first user. The computer-readable medium may be a non-transitory computer-readable medium.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for user partitioning on a computer device to allow multiple users to modify an application.

According to the methods disclosed herein, the computer device may create a per-user location for a first user when installing an application package to an installation location. For security, the installation location may be an immutable location that stores read-only files for the application. The per-user location may be a mutable location that stores modified files or new files for the user. The computer device may project installed package files from the installation location into the per-user location via one or more filter drives. Projecting the installation location may make the files appear as if they are located within the per-user location even though the files may remain at the physical disk space for the installation location. The user may modify the files for the application via the per-user location. The computer device may write at least one modified file into the per-user location. Accordingly, the installation location may retain the originally installed files and the per-user location may store new or modified files. Because only a portion of the application files are expected to be modified, projecting the originally installed files may use less disk space than making a full copy of the application in the per-user location. The user may execute the application from a central location for all users. For example, the per-user location may be projected into the central location such that the user appears to be modifying or executing files that are common to all users. Therefore, the separation of users may be transparent to the individual users such that the user does not need to maintain or manage a separate location for modified files. The application may be configured to load application files from either the per-user location for the current user, or from the installation location (e.g., if the file is not modified or if the application blocks modification).

Figure 1:
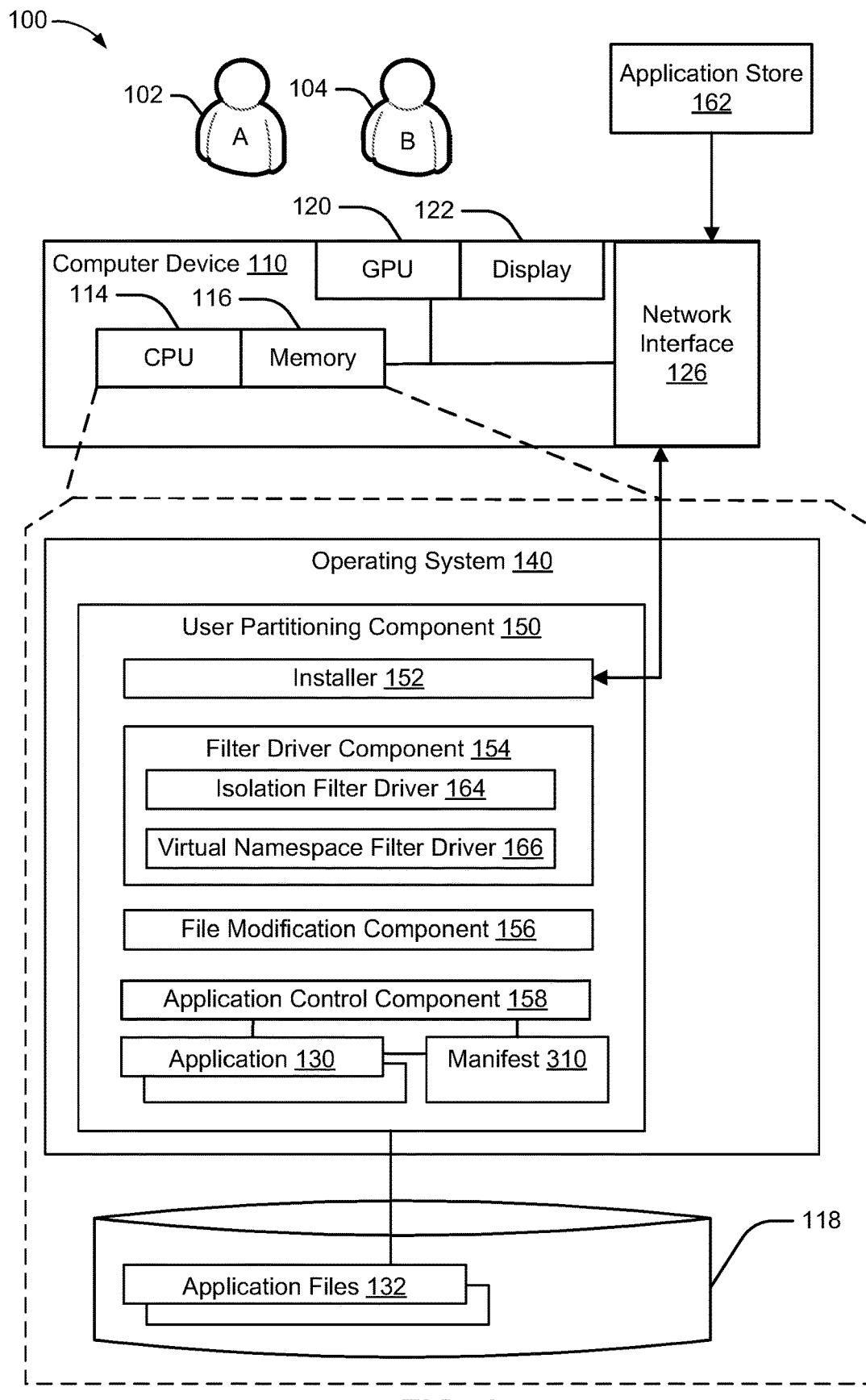
FIG. 1 is a diagram of an example computer system for partitioning application files for multiple users on a computer device, in accordance with an implementation of the present disclosure.

Referring now to FIG. 1, an example computer system 100 includes a computer device 110. The computer device 110 may be, for example, any mobile or fixed computer device including but not limited to a desktop or laptop or tablet computer, a cellular telephone, a gaming device, a mixed reality or virtual reality device, a music device, a television, a navigation system, a camera, a personal digital assistant (PDA), a handheld device, any other computer device having wired and/or wireless connection capability with one or more other devices, or any other type of computerized device capable of installing and executing files.

The computer device 110 may include a central processing unit (CPU) 114 that executes instructions stored in memory 116. For example, the CPU 114 may execute an operating system 140 and one or more applications 130. The computer device 110 may also include a graphics processing unit (GPU) 120 for rendering an image for display on a display 122. For example, the display may present a user interface (UI) of the operating system 140 and/or the one or more applications 130.

The computer device 110 may include a display 120. The display 120 may be, for example, a computer monitor or a touch-screen. The display 120 may have a maximum display size. In an implementation, the display 120 may be sub-divided into smaller portions. For example, a window may be a movable and resizable display area within the display 120. A window may have an adjustable display size.

Memory 116 may be configured for storing data and/or computer-executable instructions defining and/or associated with an operating system 140 and/or application 130, and CPU 114 may execute operating system 140 and/or application 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114.

In an implementation, the memory 116 may include a storage device 118, which may be a non-volatile memory. The storage device 118 may store application files 132 corresponding to applications 130. The operating system 140 may implement a file system that assigns a unique location and name to each file. The operating system 140 may translate requests for a file from the unique location and name to the physical address of the file on the storage device 118.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The operating system 140 may include a user partitioning component 150 for providing access to applications 130 for individual users. The user partitioning component 150 may manage installation of installation packages, installed executable files, and executable files that were not installed. In an implementation, the user partitioning component 150 is a component of the operating system 140 that may be utilized whenever a request to perform an operation on a file is received. In another implementation, the user partitioning component 150 may be an application that provides an execution environment for other applications. For example, executable files may be installed for execution within the execution environment. In either case, when an operation to a file is requested, the user partitioning component 150 may identify the correct file based on a current user.

The user partitioning component 150 may include: an installer 152 for installing an application package to an installation location and creating a per-user location for at least a first user; a filter driver component 154 for projecting installed application files from the installation location into the per-user location; a file modification component 156 for receiving a modification to the installed application files and writing at least one modified file into the per-user location; and an application control component 158 for loading, during execution of the application by the user from a central location for all users, the modified file from the per-user location for the first user.

The installer 152 may include computer executable instructions for installing an application package. The installer 152 may install application files 132 from an installation package to the storage device 118. An installation package may be an executable file including code for installing other executable files. For example, the installer 152 may obtain an application package from an application store 162 via the network interface 126. The installer 152 may allow or block execution of an installation package based on a source, reputation, or other property of the application package. When the installer 152 installs files from the application package, the installer 152 may copy the files to an installation location. The installation location may be common for all users and may be read-only to applications other than the installer 152. The installer 152 may also create a per-user location for at least the first user that installs the application. The per-user location may be, for example, a directory in a file system. The per-user location may be mutable by the first user. That is, the first user may have permission to read, write, and execute files in the per-user location. In an implementation, the installer 152 may not copy any files into the per-user location at the time of installation because all of the application files may be available in the installation location.

The filter driver component 154 may include computer executable instructions for projecting files from a first location into a second location. Projecting a file may refer to causing a file that is stored at the first location to appear as if the file is stored at a second location. In an implementation, the filter driver component 154 may include an isolation filter driver 164 and a virtual namespace filter driver 166. As discussed in further detail below, the isolation filter driver 164 makes the files in the first location available for reading at the second location, but provides isolation by performing a copy-on write for any modifications. That is, the isolation filter driver 164 makes a copy of the file in the second location when a write operation is performed. The virtual namespace filter driver 166 projects a file from a first location to a second location by changing the virtual namespace for files. That is, the virtual namespace filter driver 166 redirects a request for a file at the second location to the first location. Accordingly, if modifications are allowed, the modifications will affect the file at the first location. In an aspect, the filter driver component 154 utilizes the isolation filter driver 164 and the virtual namespace filter driver 166 to provide isolation between users while also making files for each user appear to be from a common location.

The file modification component 156 may include computer executable code for receiving a modification to application files and writing at least one modified file into the per-user location. For example, the file modification component 156 may interact with the application 130 and/or a user. For instance, the application 130 may write to its own application files and/or modify application files in its own directory. Because the application files 132 are projected from the installation location to the per-user location, the file modification component 156 may write files to the per-user location for the user executing the application 130. Similarly, the user may modify the application files 132 for the application 130 using the operating system 140 or another application. Once again, because the application files 132 are projected from the installation location to the per-user location, the file modification component 156 may write any modified files to the per-user location.

The application control component 158 may include computer executable code for loading files during execution of the application by a user from a central location for all users. The application control component 158 may select the correct file to load based on the user and the configuration of the application. For example, in an aspect, an application 130 may be associated with an application manifest 310 that has an entry indicating that per-user modification is active and designating a per-user location. When the application is executed by a current user and the application requests to load a file, the application control component 158 may first check the per-user location for the current user for a copy of the requested file. If the requested file is not stored in the per-user location (e.g., because the user and the application have not modified the file for the user), the application control component 158 may load the file from the installation location. In an implementation, the user partitioning component 150 and/or the application control component 158 may allow the application to request to load modified files, or files from the installation folder. For instance, the user partitioning component 150 may include an application programming interface (API) for designating the file to load.

Figure 2:
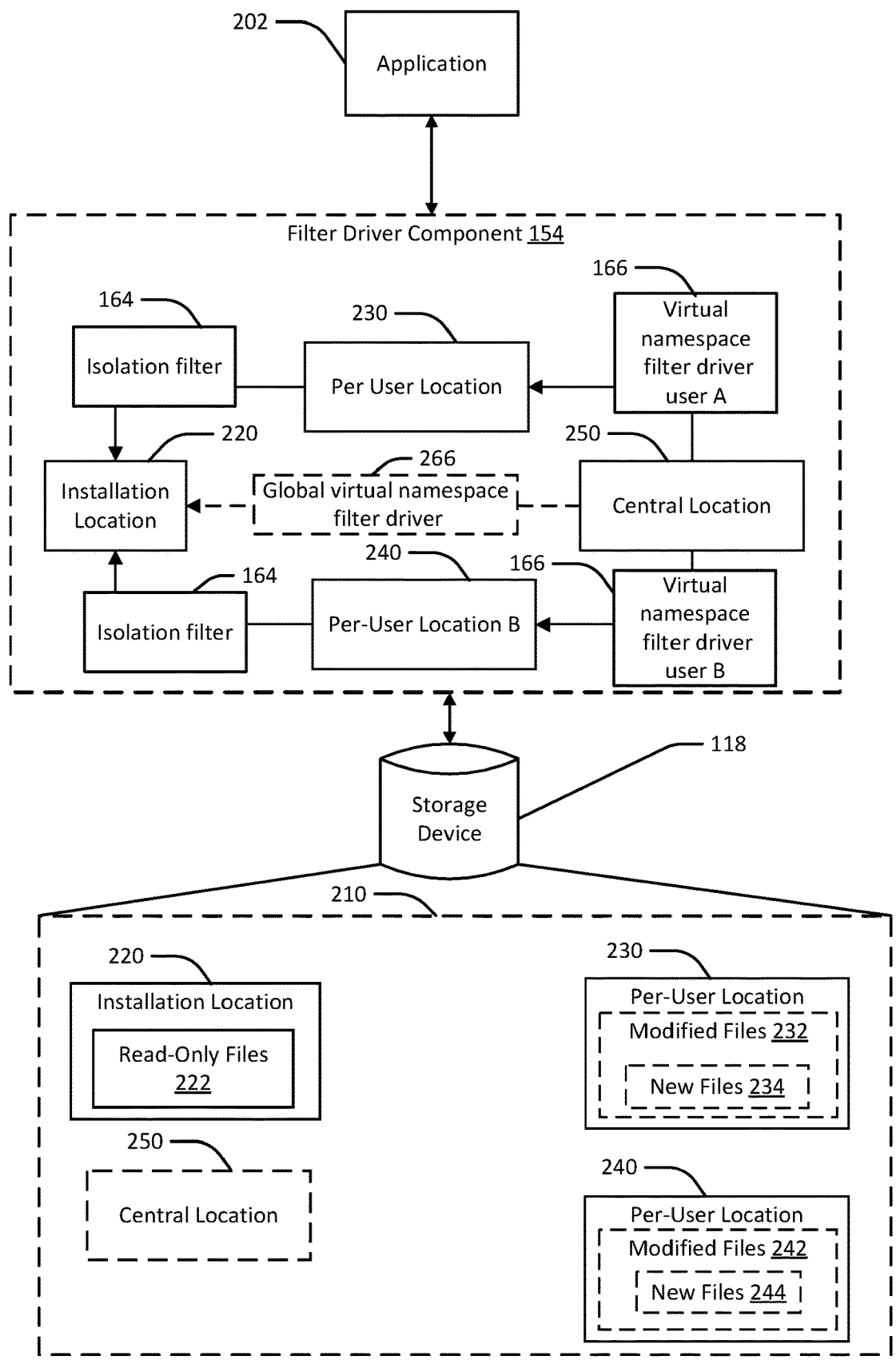
FIG. 2 is conceptual diagram illustrating projection of application files to per-user locations, in accordance with an implementation of the present disclosure.

FIG. 2 illustrates an example of a configuration for the filter driver component 154 in accordance with one or more implementations. As shown in FIG. 2, an application 202 is installed on a computer device, which may be the computer device 110 including the storage device 118. As part of the installation process, one or more (n) application files are written to the storage device 118 by the installer 152 invoking the filter driver component 154. The filter driver component 154 manages writing of data to the storage device 118 and reading of data from the storage device 118 for various executable files on the computer device 110. The storage device 118 is configured according to a file system 210. The application files may be written to an installation location 220 as read-only files 222. The installation location 220 may be common for all users. The installation location 220 may be referred to as a package root. The installer 152 may also create the per-user location 230 for the first user 102 and/or the per-user location 240 for the second user 104. The per-user location 230, 240 may be referred to as a user modification (or mod) directory. In an implementation, per-user locations may be created when an application is installed for a user. If an application is already installed for a first user 102 (e.g., user A) and a second user 104 (e.g., user B) installs the application, the installer 152 may not copy the read-only files 222 again. Instead, the installer 152 may register the application to the second user and create the per-user location 240. The filter driver component 154 may write modified files 242 including new files 244 for the second user 104 to the per-user location 240. The per-user location 230 and the per-user location 240 may be separate locations in the file system 210 on the storage device 118. Initially, the per-user location 230 and the per-user location 240 may not include any files.

The filter driver component 154 may use the isolation filter driver 164 and the virtual namespace filter driver 166 to project the read-only files 222 to a respective per-user location 230, 240 for each user. In some implementations, the per-user locations 230, 240 may be projected to a central location 250. More specifically, for an example with two users, A and B, the filter driver component 154 may use the isolation filter driver 164 to project the installation location 220 to the per-user location 230 for the first user 102 and use the isolation filter driver 164 to project the installation location 220 to the per-user location 240. Accordingly, when the first user 102 (or an application executed by the first user 102) retrieves the per-user location 230, per-user location 230 will appear to include the read-only files 222. If the first user 102 attempts to modify the read-only files 222 or add a new file to the installation location 220, the isolation filter driver 164 will instead create a modified file 232 or new file 234 in the per-user location 230. The files projected into the per-user location 240 will still be the read-only files 222. Accordingly, the modifications by the first user 102 do not affect the second user 104.

In an implementation, to make the per-user locations 230, 240 transparent to the user, the filter driver component 154 may project the per-user location 230, 240 to a central location 250 using a virtual namespace filter driver 166 configured for each user. The virtual namespace filter for the first user 102 projects the per-user location 230 to the central location 250 and the virtual namespace filter for the second user 104 projects the per-user location 240 to the central location 250. The central location 250 may be a virtual directory. That is, the central location 250 may not include any files in the file system 210 on the storage device 118. Instead, the filter driver component 154 may use the virtual namespace filter driver 166 to project files into the central location 250. For applications that are not configured with per-user locations, the filter driver component 154 may optionally utilize a global virtual namespace filter driver 266 to project files from the installation location 220 to the central location 250.

Figure 3:
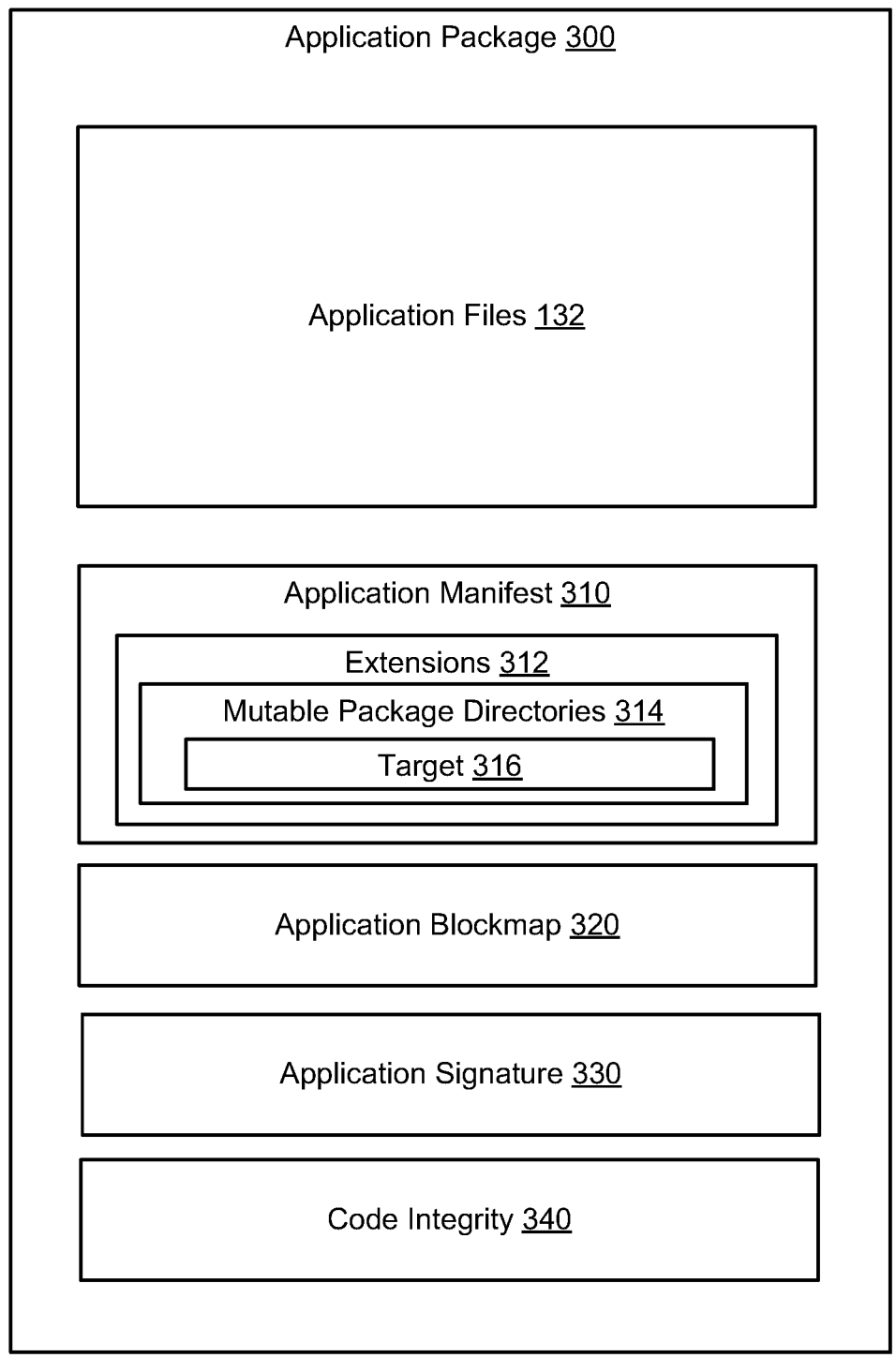
FIG. 3 is a conceptual diagram of an example application package specifying per-user partitioning, in accordance with an implementation of the present disclosure.

FIG. 3 is a diagram of an example application package 300. The application package 300 may include an application payload and footprint files. The application payload may include the application files 132. The footprint files may include an application manifest 310, an application blockmap 320, an application signature 330, and a code integrity 340. The application files 132 may include the application code files and assets that are created when the application is built. The application manifest 310 may be a document that contains information the system uses to deploy, display, and update the application. The info may include package identity, package dependencies, required capabilities, visual elements, and extensibility points. In particular, the application manifest 310 may include extensions 312 defining mutable package directories 314 and a target 316. The target 316 may define the target directory for the per-user locations 230, 240. The application blockmap 320 may be a document that contains a list of the application files 132 along with indexes and cryptographic hashes for each block of data that is stored in the application package 300. The application blockmap 320 is verified and secured with a digital signature when the package is signed. The application blockmap 320 allows the application package 300 to be downloaded and validated incrementally, and also works to support differential updates to the application files 132 after installation. The application signature 330 is generated when the package is signed. The application signature 330 may be used to verify the application blockmap 320 and the application files 132.

Figure 4:
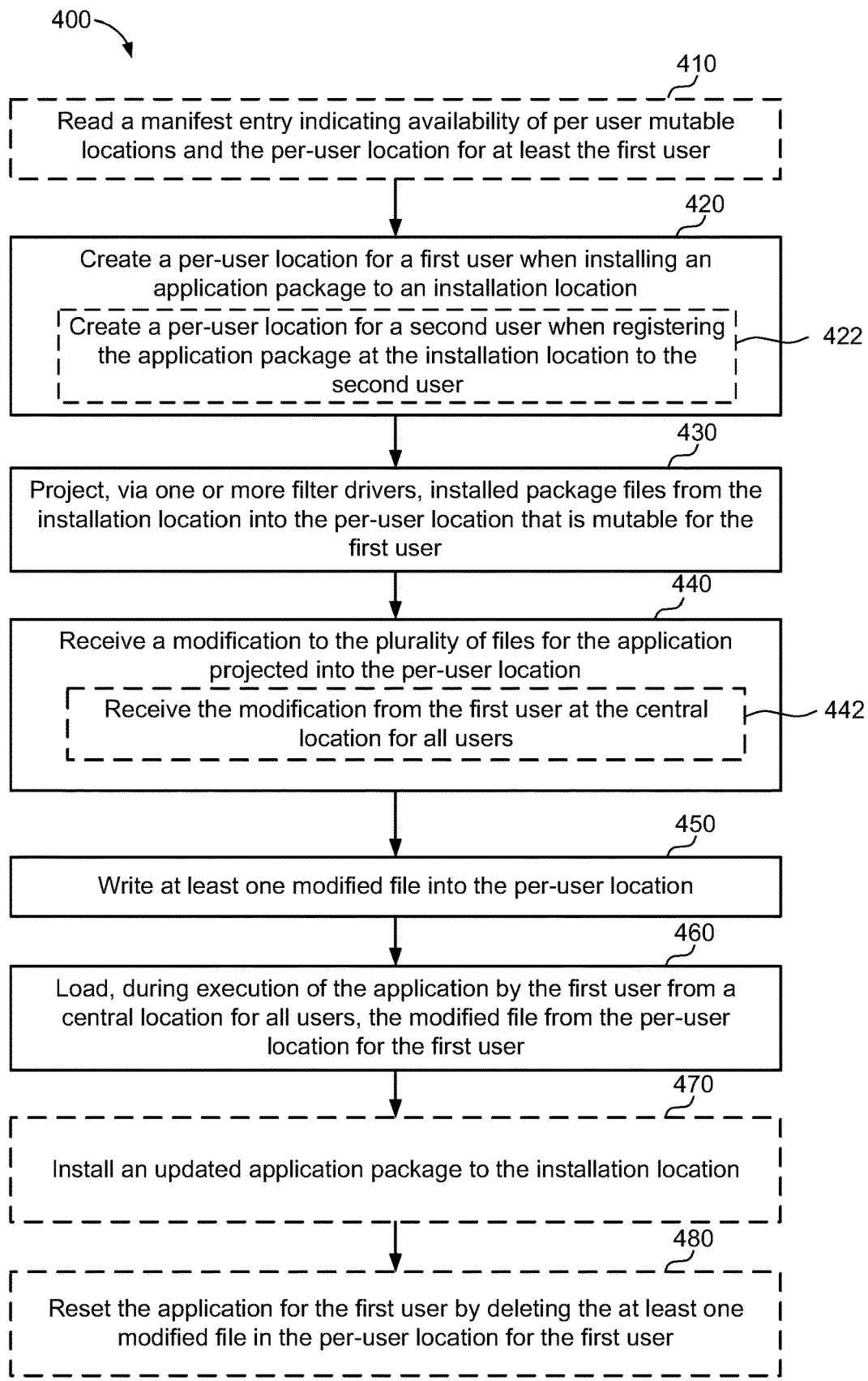
FIG. 4 is a flowchart of an example method of executing application files that are partitioned for multiple users, in accordance with an implementation of the present disclosure.

Turning to FIG. 4, an example method 400 partitions modifications to application files to allow different users to modify the application. For example, method 400 may be performed by a user partitioning component 150 of the operating system 140 on the computer device 110. Optional blocks are shown with dashed lines.

At block 410, the method 400 may optionally include reading a manifest entry indicating availability of per-user mutable locations and the per-user location for at least the first user. For example, the installer 152 may read the manifest entry for extensions 312. The manifest entry may be a package extension in the application package 300. The presence of the mutable package directories 314 may indicate availability of per-user mutable locations. The manifest entry may define a name (e.g., target 316) for the per-user location 230, 240. The installer 152 may read the manifest entry to determine whether user partitioning for modifications is supported for the application.

At block 420 the method 400 may include creating a per-user location for a first user when installing an application package to an installation location. For instance, the installer 152 may creating a per-user location 230 for a first user 102 when installing an application package to an installation location 220. The application package may include a plurality of files (e.g., application files 132) for the application 130 that are read-only for the first user 102. For example, the first user 102 login to the operating system 140 and install the application 130 from an application store 162 or other source such as a removable disk or card. The installer 152 may determine whether the application 130 is already installed for another user. If the application 130 is not installed, the installer 152 may extract the application files 132 from the application package and copy the application files 132 to the installation location 220 as read-only files 222. The installer 152 may also create the per-user location 230 for the first user 102.

In an aspect, where the application is already installed for the first user 102 and the second user 104 is logged into the operating system and attempts to install the application 130, the method 400 may include sub-block 422. At sub-block 422, the installer 152 may create a per-user location 240 for the second user 104 when registering the application package at the installation location 220 to the second user 104. That is, instead of making another copy of the read-only files 222, the installer 152 may register the read-only files 222 for the second user 104.

At block 430, the method 400 may include projecting, via one or more filter drivers, installed package files from the installation location into the per-user location that is mutable for the first user. For example, the filter driver component 154 may project the read-only files 222 from the installation location 220 to the per-user location 230 that is mutable for the first user 102. In some implementations, the one or more filter drivers include the isolation filter driver 164. The isolation filter driver 164 may make a target directory (e.g., the installation location 220) appear in a source directory (e.g., the per-user location 230). In some implementations, the one or more filter drivers include the virtual namespace filter driver 166. The virtual namespace filter driver 166 may make the per-user location 230 for the first user 102 appear in the central location 250.

At block 440, the method 400 may include receiving a modification to the plurality of files for the application projected into the per-user location. For example, the file modification component 156 may receive the modification the application files 132 (e.g., read-only files 222) that are projected into the per-user location 230. In an aspect, the modification of the application files 132 may be by the application 130. For example, the application 130 may add to or modify the application files 132. For instance, a video game application may generate a game save file. In another aspect, the modification of the application files 132 may be by the first user 102. For example, in sub-block 442, the file modification component 156 may receive the modification from the first user at the central location 250 for all users. For example, the first user 102 may add a new file or replace a file. The first user 102 may modify the application files 132 from the central location 250. For instance, a user may replace a background image file or object skin file for a video game application in the central location. As discussed above, the central location 250 may be a virtual directory where the files are projected from another location such as the per-user location 230 and optionally the installation location 220. As another example, a user may install a plug-in by copying one or more files into the application files 132.

At block 450, the method 400 may include writing at least one modified file into the per-user location. For example, the file modification component 156 may write the at least one modified file into the per-user location 230 via the filter driver component 154. The at least one modified file 232 may be a file that is different than the read-only files 222. The at least one modified file may include a new file 234 that is not included in the read-only files 222 or a file with the same name as one of the read-only files but with different content.

At block 460, the method 400 may include loading, during execution of the application by the first user from a central location for all users. For example, the application control component 158 may load, during execution of the application 130 by the first user 102 from the central location 250, the at least one modified file 232. For example, the application control component 158 may receive a user command such as clicking or double-clicking an icon, selecting a run command from a menu, or entering a command on a command-line to execute the application 130. In some implementations, the executable application file selected by the user may be a modified file 232. In some implementations, the executable application file selected by the user may be a read-only file 222 that loads one or more of the modified files 232. For instance, the application 130 may search for library files (e.g., dynamic link library (.DLL) files) in the per-user location 230. Accordingly, modifications may include plug-ins or extensions. The application control component 158 may suppress a code integrity check of the modified files 232. That is, the application control component 158 may allow the application 130 to execute code that was not included in the application package 300. However, because the modified file 232 is limited to the per-user location any changes caused by the modified code will only affect the first user.

In an aspect, the application developer may determine whether to load each file from the installation location 220, the per-user location 230, or a current location, which may be the central location 250. For instance, the user partitioning component 150 may include an application programming interface (API) for designating the file to load.

At block 470, the method 400 may optionally include installing an updated application package to the installation location. For example, the installer 152 may receive the updated application package from the application store 162. The installer 152 may copy one or more updated files to the installation location 220. The updated files may conflict with one or more of the files in the per-user location 230. If an updated file has the same name as a modified file 232, the installer 152 may delete the modified file that corresponds to the updated file. If the modified file 232 does not correspond to any file in the updated application package (i.e., does not have the same name), the installer 152 may maintain the at least one modified file in the per-user location 230.

At block 480, the method 400 may optionally include resetting the application for the first user by deleting the at least one modified file in the per-user location for the first user. For example, the installer 152 may provide an option for the user to reset the application. When the user resets the application, the installer 152 may delete any files in the per-user location 230 for the first user 102 for the application 130. Accordingly, after reset, the application 130 may only load files from the read-only files 222 corresponding to the originally installed files. In an aspect, the installer 152 may also uninstall an application 130. The installer 152 may delete both the read-only files 222 and the modified files 232 when uninstalling the application 130.

Figure 5:
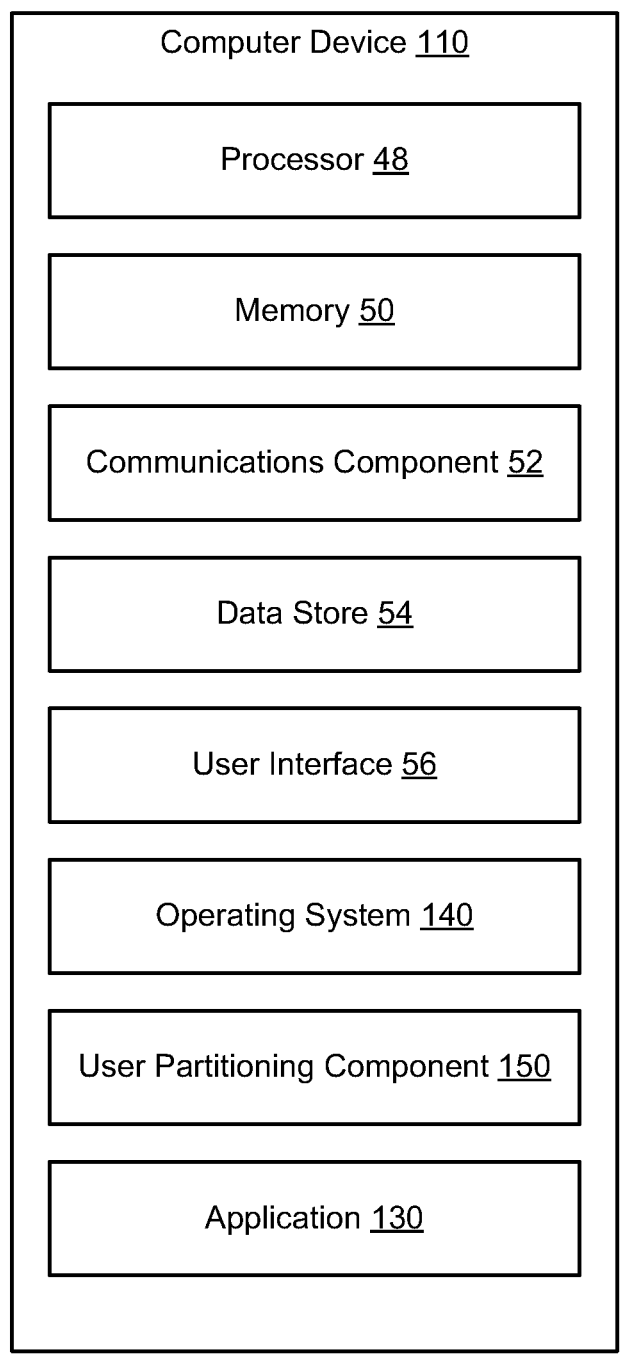
FIG. 5 is a schematic block diagram of an example computer device, in accordance with an implementation of the present disclosure.

Referring now to FIG. 5, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114.

In an example, computer device 110 may include memory 50 for storing instructions executable by the processor 48 for carrying out the functions described herein. In an implementation, for example, memory 50 may include memory 116.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 and/or applications 130. The data store may include memory 116 and/or storage device 118.

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 130. In addition, processor 48 may execute operating system 140 and/or application 130, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
 a memory; and
 at least one processor communicatively coupled to the memory, configured to:
  create a first per-user location for a first user when installing an application package to an installation location, the application package including a plurality of files for an application that are read-only for the first user, wherein the first per-user location is separate from each of a plurality of other per-user locations each associated with one other user among a plurality of users;

project, via one or more filter drivers of an operating system, installed package files from the installation location into the first per-user location that is mutable for the first user;

receive a modification to the plurality of files for the application projected into the first per-user location;

write at least one modified file into the first per-user location; and load, during execution of the application by the first user from a central location for all users, the at least one modified file from the first per-user location for the first user.

2. The computer device of claim 1, wherein the one or more filter drivers include an isolation filter driver that makes a target directory appear in a source directory for each per-user location, wherein changes to the source directory do not affect the target directory.

3. The computer device of claim 2, wherein the one or more filter drivers include a virtual namespace filter driver that makes the first per-user location for the first user appear in the central location, wherein changes to the central location for the first user affect the first per-user location for the first user.

4. The computer device of claim 1, wherein the application modifies one or more of the plurality of files for the application projected into the first per-user location when executed for the first user.

5. The computer device of claim 1, wherein the application indicates to load one or more of the plurality of files for the application from: the installation location, the first per-user location, or a current location.

6. The computer device of claim 1, wherein the at least one processor is configured to receive the modification from the first user at the central location for all users.

7. The computer device of claim 1, wherein the at least one processor is configured to read a manifest entry indicating availability of per-user mutable locations among the plurality of other per-user locations and the first per-user location for at least the first user.

8. The computer device of claim 1, wherein the at least one processor is configured to create a second per-user location among the plurality of other per-user locations for a second user among the plurality of users when registering the application package at the installation location to the second user, wherein the first per-user location is separate and partitioned from the second per-user location.

9. The computer device of claim 1, wherein the at least one processor is configured to reset the application for the first user by deleting the at least one modified file in the first per-user location for the first user.

10. The computer device of claim 1, wherein the at least one processor is configured to install an updated application package to the installation location, delete the at least one modified file from the first per-user location if the at least one modified file corresponds to a file in the updated application package and maintain the at least one modified file from the first per-user location if the at least one modified file does not correspond to any file in the updated application package.

11. A method of allowing modifications of an application by multiple users, comprising:

creating a first per-user location for a first user when installing an application package to an installation location, the application package including a plurality of files for an application that are read-only for the first user, wherein the first per-user location is separate from each of a plurality of other per-user locations each associated with one other user among a plurality of users;

projecting, via one or more filter drivers of an operating system, installed package files from the installation location into the first per-user location that is mutable for the first user;

receiving a modification to the plurality of files for the application projected into the first per-user location;

writing at least one modified file into the first per-user location; and loading, during execution of the application by the first user from a central location for all users, the at least one modified file from the first per-user location for the first user.

12. The method of claim 11, wherein the one or more filter drivers include an isolation filter driver that makes a target directory appear in a source directory for each per-user location, wherein changes to the source directory do not affect the target directory.

13. The method of claim 12, wherein the one or more filter drivers include a virtual namespace filter driver that makes the first per-user location for the first user appear in the central location, wherein changes to the central location for the first user affect the first per-user location for the first user.

14. The method of claim 11, wherein the application modifies one or more of the plurality of files for the application projected into the first per-user location when executed for the first user.

15. The method of claim 11, wherein the application indicates to load one or more of the plurality of files for the application from: the installation location, the first per-user location, or a current location.

16. The method of claim 11, wherein receiving the modification to the plurality of files comprises receiving the modification from the first user at the central location for all users.

17. The method of claim 11, further comprising reading a manifest entry indicating availability of per-user mutable locations among the plurality of other per-user locations and the first per-user location for at least the first user.

18. The method of claim 11, further comprising creating a second per-user location among the plurality of other per-user locations for a second user among the plurality of users when registering the application package at the installation location to the second user, wherein the first per-user location is separate and partitioned from the second per-user location.

19. The method of claim 11, further comprising resetting the application for the first user by deleting the at least one modified file in the first per-user location for the first user.

20. A non-transitory computer-readable medium, comprising code executable by one or more processors for allowing modifications of an application by multiple users, the code comprising code for:

creating a first per-user location for a first user when installing an application package to an installation location, the application package including a plurality of files for an application that are read-only for the first user, wherein the first per-user location is separate from each of a plurality of other per-user locations each associated with one other user among a plurality of users;

projecting, via one or more filter drivers of an operating system, installed package files from the installation location into the first per-user location that is mutable for the first user;

receiving a modification to the plurality of files for the application projected into the first per-user location;
writing at least one modified file into the first per-user location; and
loading, during execution of the application by the first user from a central location for all users, the at least one modified file from the first per-user location for the first user.

* * * * *